United States Patent [19]

Crandon et al.

[11] 4,303,057
[45] Dec. 1, 1981

[54] SWIMMING POOL SOLAR HEATER

[76] Inventors: Reba L. Crandon, 10406 N. 21st St.;
Elwood Marple, 1330 137 Ave., E.,
both of Tampa, Fla. 33612

[21] Appl. No.: 66,931

[22] Filed: Aug. 16, 1979

[51] Int. Cl.³ .............................. F24J 3/02; G02B 7/02
[52] U.S. Cl. ..................................... 126/415; 126/440;
350/245
[58] Field of Search ............... 126/415, 416, 424, 425;
350/245, 256

[56] References Cited
U.S. PATENT DOCUMENTS

| | | | |
|---|---|---|---|
| 496,959 | 5/1893 | Severy | 126/440 |
| 1,224,011 | 4/1917 | Parker | 126/440 |
| 1,658,455 | 2/1928 | Metzech | 126/424 |
| 4,137,612 | 2/1979 | Kelley | 126/415 |
| 4,205,661 | 6/1980 | Chapman | 126/425 |

Primary Examiner—Samuel Scott

[57] ABSTRACT

A swimming pool solar heater is disclosed comprising a plurality of sunlight condenser elements each having a plurality of condensing lenses secured in a frame. The plurality of condenser elements are rotatably mounted relative to a base for condensing the sunlight and projecting the condensed sunlight on to the water within the swimming pool. A motor drives a shaft for simultaneously rotating the plurality of sunlight condenser elements to compensate for the relative movement between the sun and the earth and maintain the condensed sunlight impinging upon the water within the swimming pool. The foregoing abstract is merely a resume of one general application, is not a complete discussion of all principles of operation or applications, and is not to be construed as a limitation on the scope of the claimed subject matter.

3 Claims, 9 Drawing Figures

SWIMMING POOL SOLAR HEATER

BACKGROUND OF THE INVENTION

1. Field of the Invention

This invention relates to solar heating, and more particularly to the solar heating of a swimming pool.

2. Description of the Prior Art

With the increased price of fossilized fuel and the corresponding increase in the cost of producing electric heating, an enormous investigation has been undertaken to harness alternate forms of energy. Solar energy promises to be one of the more fruitful and desirable alternatives to fossilized fuel. An important area in solar heating is in the area of solar swimming pool heating. Various devices have been devised to heat the water within the swimming pool to extend the useful season of the swimming pool for the consumer. U.S. Pat. No. 3,072,920 to Yellott shows a novel swimming pool cover for collecting or reflecting solar heat. The device can either increase the temperature of water or reflect the sunlight depending upon the orientation of the cover.

U.S. Pat. No. 3,314,415 to Rowekamp is a structural modification to a pool type solar collector which is adaptable to a swimming pool structure.

U.S. Pat. No. 3,893,443 to Smith illustrates a floating solar heater for a swimming pool having a translucent cover enclosing a chamber of a substantially dead air space.

U.S. Pat. No. 3,949,095 to Pelehach et al shows a solar heating device for a swimming pool comprising an inflatable raft having a thermally reflected bottom and a thermally transparent top surface.

U.S. Pat. No. 3,984,882 to Forman et al illustrates a panel structure for use on water such as a swimming pool comprising a plastic frame with a plastic sheet extending across an open zone with the sheet having a woven construction for defining air-filled interstices distributed over the sheet area across the open zone.

U.S. Pat. No. 4,002,031 to Bell shows a solar energy converter with waste heat engine incorporating a plurality of optical concentrators directing sunlight to Gallium Arsenide photovoltaic cells.

U.S. Pat. No. 4,022,187 to Roberts shows a floating solar heater for a swimming pool comprising an upper transparent panel and an opaque bottom panel defining a thermal compartment therebetween.

U.S. Pat. No. 4,068,653 to Bourdon et al shows a solar heating unit incorporating movable panels for compensating for the relative movement between the sun and the earth.

U.S. Pat. No. 4,078,547 to Malecek relates to a solar heater incorporating parallel mirrors for concentrating the sun rays to a boiler or the like.

U.S. Pat. No. 4,078,548 shows a high efficiency solar panel having a plurality of concentrators disposed about the surface of incidental sunlight.

U.S. Pat. No. 4,082,081 to McColgan et al shows a portable lightweight solar heater incorporating a lightweight flexible unit floating upon the surface of the swimming pool which functions as a flat plate collector by virtue of the water circulating through the system.

Finally, U.S. Pat. No. 4,090,496 to Mallet shows a compound to form bodies for generating heat from radiant luminous energy which may be formed in a submersible device for a swimming pool or the like.

Although these inventions have solved various needs in the prior art, there is further need to provide a system which concentrates the direct light emitted by the sun onto the water contained within the swimming pool.

Therefore it is an object of this invention to provide an apparatus which overcomes the aforementioned inadequacies of the prior art devices and provides an improvement which is a significant contribution to the advancement of the solar heating art.

Another object of this invention is to provide a swimming pool solar heater including a plurality of sunlight condenser elements each having a plurality of condensing lenses secured to a frame and rotatably mounted for projecting the condensed sunlight onto the water within the swimming pool.

Another object of this invention is to provide a swimming pool solar heater including a motor for rotating the plurality of condenser elements for maintaining the projection of condensed sunlight onto the water within the swimming pool during the relative movement between the earth and the sun.

Another object of this invention is to provide a swimming pool solar heater having a base disposed along an edge of the swimming pool having a plurality of sockets for removably receiving a support shaft extending from each of the plurality of sunlight condenser elements.

Another object of this invention is to provide a swimming pool solar heater comprising a single motor driving a shaft with plurality of drive means spaced along the drive shaft for engaging the plurality of sockets for simultaneously moving the plurality of condenser elements.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings and explained in the detailed discussion. For the purpose of summarizing the invention, the invention may be incorporated into a swimming pool solar heater comprising a plurality of sunlight condenser elements each having a plurality of condensing lenses secured in the frame. The plurality of sunlight condenser elements are rotatably mounted for projecting the condensed sunlight onto the water within the swimming pool. A motor rotates the plurality of condenser elements to compensate for the relative movement between the sun and the earth thereby maintaining the projection of the condensed sunlight onto the water within the swimming pool.

In a more specific embodiment of the invention, the swimming pool heater includes the condensing lenses each being disposed in the single plane. In another embodiment, the lenses are disposed in multiple planes with one of the lenses at least partially overlapping another of the lenses.

In a further embodiment, each of the condenser elements is supported by a support shaft. A base is secured along the edge of the swimming pool with a plurality of the sockets disposed in the base for removably receiving the support shaft of the plurality of condenser elements. Preferably, the shaft and the sockets are keyed enabling insertion in a preferred orientation. The base may include means for varying the angular orientation of the sockets relative to the earth for adjusting the angular position of the condenser elements in accordance with the latitude of the installation. This angular movement is perpendicular to the movement along the support shafts by motor means.

In the preferred form, motor means comprises a drive shaft extending along the base. A plurality of gears are spaced along the drive shaft for simultaneously rotating the plurality of sockets and thereby rotating the plurality of condenser elements.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE DRAWINGS

Figure 1:
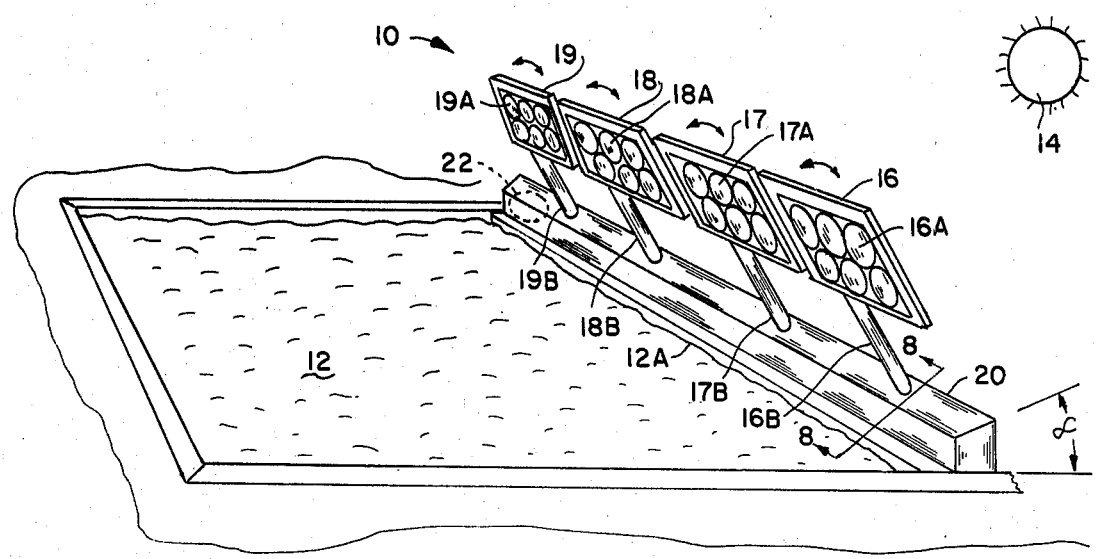
FIG. 1 is a perspective view of the preferred embodiment of the invention showing a swimming pool solar heater.

FIG. 1 is a perspective view of a swimming pool heater 10 for heating a swimming pool 12 by condensing sunlight emitted from the sun 14. The heater 10 comprises a plurality of sunlight condenser elements 16-19 each having a plurality of condenser lenses 16A-17A for projecting the condensed sunlight onto the water within the swimming pool 12. The condenser elements 16-19 further comprise support shafts 16B-19B which rotatably mount the condenser elements 16-19 relative to a base 20 secured to the earth along an edge 12A of the swimming pool 12. A motor means 22 which is more fully shown in FIG. 9 enables each of the plurality of condensor elements 16-19 to rotate about support shafts 16B-19B to compensate for the relative movement between the earth and the sun thereby maintaining the projection of the condensed sunlight onto the water within the swimming pool.

Figures 2, 3:
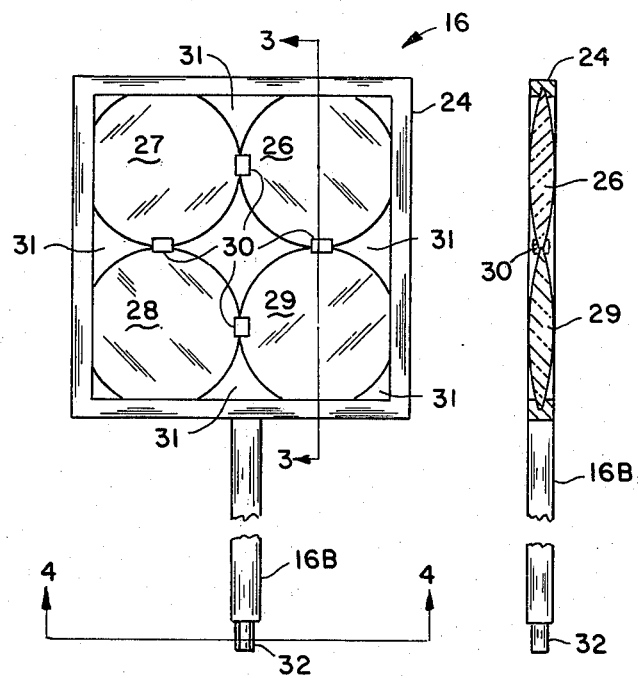
FIG. 2 is an elevational view of one of the condenser elements shown in FIG. 1.
FIG. 3 is a sectional view along line 3—3 in FIG. 2.
Figure 4:
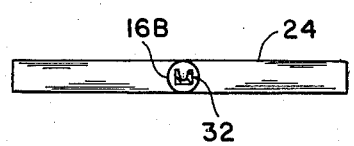
FIG. 4 is a sectional view along line 4—4 in FIG. 2.

FIGS. 2-4 illustrate a first embodiment of the condenser element 16 comprising a frame 24 extending about and securing a plurality of condensing lenses 26-29 secured to the frame 24. The frame 24 is supported by support shaft 16B terminating in a key 32 shown more fully in FIG. 4. The frame 24 secures the terminating edges of the condensing lenses 26-29 with clips 30 securing adjacent peripheral areas of the condensing lenses 26-29. Accordingly, voids 31 are provided in the condenser element 16 to reduce the air resistance of the structure.

Figure 5:
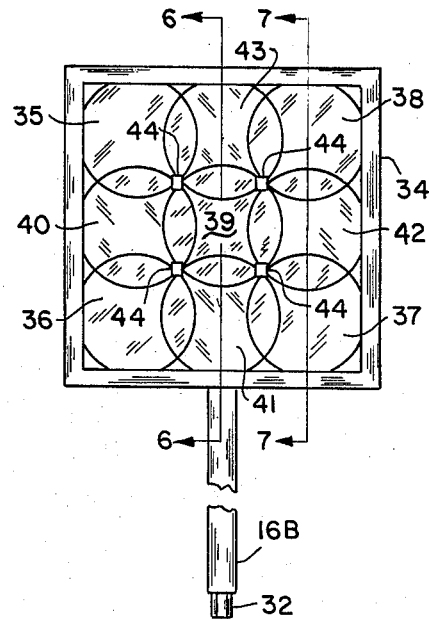
FIG. 5 is a variation of the condenser element shown in FIGS. 2-4.
Figure 6:
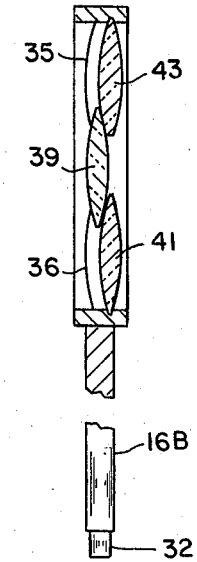
FIG. 6 is a sectional view along line 6—6.
Figure 7:
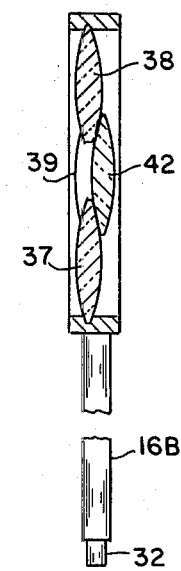
FIG. 7 is a sectional view along line 7—7.

FIGS. 5-7 illustrate a variation of the invention shown in FIGS. 2-4 which is compatible for use with the invention shown in FIG. 1. In this embodiment, a frame 34 houses nine condensing lenses 35-42 which are secured by frame 34 and clips 44. Condensing lenses 35-39 are disposed in one plane whereas condensing lenses 40-43 are disposed in a second plane as shown in FIGS. 6 and 7 with a portion of some of the condensing lenses 40-43 overlapping condensing lenses 35-36. This optical system provides superior performance over the prior art. The condenser element shown in FIGS. 5-6 also comprises a support shaft 16B and a key 32 for cooperation with the base 20 as shown in FIGS. 1, 8 and 9.

Figure 8:
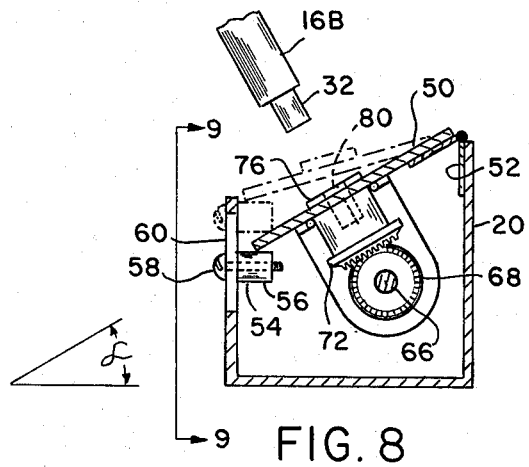
FIG. 8 is a sectional view along line 8—8 in FIG. 1.
Figure 9:
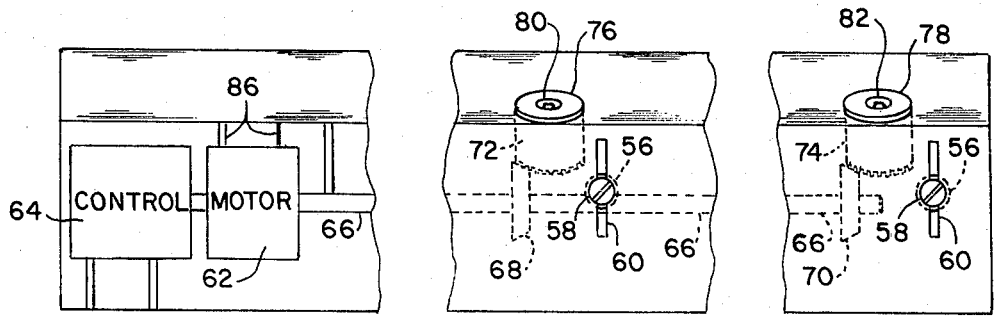
FIG. 9 is an elevational view showing the internal configurations along line 9—9 in FIG. 8.

FIG. 8 illustrates a side sectional view along line 8—8 in FIG. 1 showing the base 20 comprising an upper surface 50 mounted on a pivot hinge 52 with a stop 54 comprising a threaded bar 56 and a screw 58 which is slideably mounted in a slot 60. The adjustment of screw 50 and threaded bar 56 determines the angular position of the upper surface 50 relative to the earth. Preferably, the base angle alpha ($\alpha$) is adjusted to be equal to the angle of the latitude of the installation. Once set, this setting remains the same.

A motor 62 controlled by a controller 64 powers a drive shaft 66 with a plurality of gears 68 and 70 secured thereto. The gears 68 and 70 mesh with gears 72 and 74 which are secured to sockets 76 and 78 having socket apertures 80-82 for receiving the keys 32 of support shafts 16B. It should be appreciated that the shaft 66 and the sockets 72 and 76 are secured to the upper surface 50 and are pivotally mounted therewith. Likewise, motor 62 is secured by mountings 86 to move with the support surface 50.

The key surfaces 32 enable the collector element 16-19 to be inserted within the sockets 80 and 82 to allow the condensor elements 16-19 to heat the swimming pool. If desired, the elements 16-19 may be quickly removed from the base 20 for unrestricted use of the swimming pool after the water has been sufficiently heated.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:

What is claimed is:

1. A swimming pool solar heater, comprising in combination:
    a plurality of sunlight condenser elements each having a plurality of condensing lenses secured in a frame;
    mounting means for rotatably mounting each of said sunlight condenser elements for projecting a portion of the condensed sunlight onto the water within the swimming pool;
    motor means for rotating said plurality of condenser elements to compensate for the relative movement between the sun and the earth thereby maintaining the projection of the condensed sunlight onto the water within the swimming pool;
    each of said condenser elements being supported by a support shaft;
    a base disposed along the edge of the swimming pool;
    said base including a plurality of sockets for removably securing said support shafts of said plurality of condenser elements;
    means for varying the angular orientation of said sockets relative to the earth for adjusting the position of said condenser elements in accordance with the latitude of the installation;
    said motor means comprising a drive shaft extending along said base;
    a plurality of drive means spaced along said drive shaft for simultaneously rotating said plurality of sockets for rotating said plurality of condenser elements;
    said drive means comprising a plurality of gears spaced along said drive shaft for engagement with gears secured to said plurality of sockets;
    said sockets being keyed for removably receiving said support shafts enabling said sunlight condenser elements to be installed within said base in the identical orientation with respect to the swimming pool from which said sunlight condenser elements were oriented prior to being removed from said base.

2. A swimming pool heater as set forth in claim 1, wherein each of said condensing lenses of each of said condenser elements is disposed in a single plane.

3. A swimming pool heater as set forth in claim 1, wherein said condensing lenses of each of said condenser elements are disposed in multiple planes enabling at least one of said condensing lens to be positioned to overlap another of said condensing lenses thereby defining an overlapped portion which assures that the sunlight passing therethrough will travel in a linear path rather than being focused by said condenser element.

* * * * *